March 4, 1941.   P. S. RUSSEL   2,234,088
CONTROL DEVICE
Filed Feb. 24, 1938

INVENTOR
Philip S. Russel
BY
Andrew K. Foulds
his ATTORNEY

Patented Mar. 4, 1941

2,234,088

UNITED STATES PATENT OFFICE 2,234,088

CONTROL DEVICE

Philip S. Russel, Detroit, Mich., assignor to Detroit Lubricator Company, Detroit, Mich., a corporation of Michigan Application February 24, 1938, Serial No. 192,318

22 Claims. (Cl. 137—68)

My invention relates to new and useful improvements in devices for controlling flow of liquids and more particularly to devices for maintaining in a liquid receiving chamber a substantially constant level of liquid for supply to a place of use such as a fuel burner.

An object of my invention is to provide a liquid level control device having a floating member which will be free of change in buoyancy such as would result, for example, from leakage, water-logging, or the like.

Another object is to provide a novel auxiliary or safety cut-off mechanism for stopping flow of liquid upon predetermined increase in the liquid level above a desired level.

Another object is to provide a control device in which the liquid level maintaining mechanism may be readily inserted in or removed from the liquid reservoir as a unitary structure.

Another object is to provide means for regulating the normal or constant liquid level to be maintained, and for regulating the extent of increase of liquid level which will actuate the auxiliary mechanism.

The invention consists in the improved construction and combination of parts, and their aggroupment in operative relation, to be more fully described hereinafter and the novelty of which will be particularly pointed out and distinctly claimed.

In the accompanying drawing, to be taken as a part of this specification, I have fully and clearly illustrated a preferred embodiment of my invention, in which drawing—

Figures 1, 2, 3:
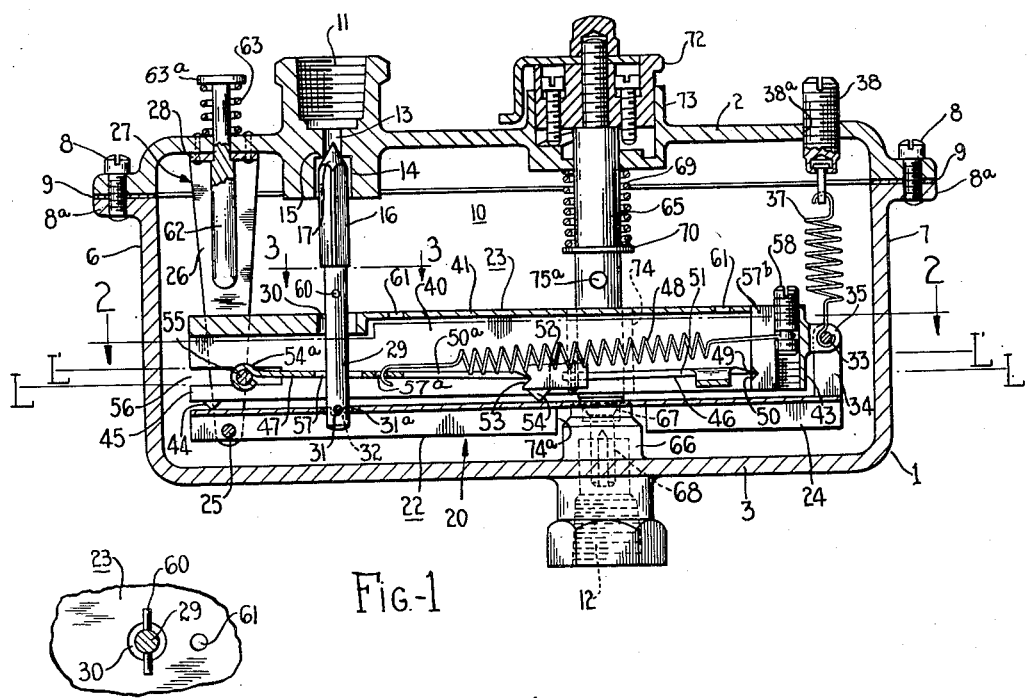
Figure 1 is a side view of my control device in longitudinal vertical section taken along the line 1—1 of Fig. 2, but with the valve adjusting mechanism shown in central vertical section for clarity.
Fig. 2 is a plan view thereof in section along the line 2—2 of Fig. 1.
Fig. 3 is a detail view in plan on the line 3—3 of Fig. 1.

Referring to the drawing by characters of reference, the numeral 1 designates in general a hollow casing or container, preferably rectangular and having a top wall 2 which serves as a supporting means, a bottom wall 3, side walls 4, 5 and end walls 6, 7. The top wall 2 is preferably a removable plate-like cover or closure member held in place by screws 8 which are threaded into flanges 8ª on the end walls 6, 7. A cover gasket 9 is preferably provided to insure a fluid tight joint. The casing 1 provides a constant level reservoir or chamber 10 having in its top wall an inlet 11 and in its bottom wall an outlet 12. The inlet 11 opens through a threaded nipple on member 2 and includes a passageway or port 13 of reduced diameter and desired flow capacity which opens downwardly into a larger bore 14 that leads or opens into the chamber 10. The downward facing annular shoulder 15 between port 13 and bore 14 provides a valve seat, for cooperation with a valve member 16 which is vertically reciprocal and guided by the wall of bore 14. The valve member 16 is preferably polygonal in cross-section to permit flow through bore 14, and has a conical or tapered valve portion 17 for metering flow through port 13 and for engagement with seat 15.

The valve member 16 is operable by a mechanism 20 which comprises both the normal liquid level responsive means and also the safety means. The mechanism 20 is disposed within the constant level chamber 10 and comprises a lower body or movable supporting member 22 and an upper movable body member 23 which are preferably of a material having a greater specific gravity than the liquid to be controlled. The lower member 22 may be of generally rectangular shape, as seen in full and dotted lines in Fig. 2, and has substantially parallel reenforcing downward extending side flanges 24. Adjacent one of its ends and between wall 6 and valve member 16, the member 22 is fulcrumed for vertical pivotal movement on a supporting shaft or pin 25 which extends between and has its ends supported in and by the apertured legs or arms 26 of a U-shaped bracket or support 27. The bracket 27 has a base portion 28 which is secured by rivets or the like to the cover member 2 and from which the arms 26 extend downward in parallel spaced relation. The shaft 25 extends through alined bearing apertures in the side flanges 24. The valve member 16 has a stem portion 29 that extends downwardly through an aperture 30 in the upper body member 23 and into engagement and abutting connection with the lower body member 22. The lower end portion of the valve stem 29 has a bearing or supporting member 31 which loosely abuts or seats on the member 22 and which is preferably a horizontally extending cross pin or rod, rigidly secured through the valve stem 29. The lower member 22 has a transverse slot or opening 31ª which terminates in upwardly facing, aligning sockets or notches 32 in the flanges 24 for receiving and retaining the ends of the pin 31 to position and guide the valve member 16. The valve member 16, it will be noted, is movable upward relative to, although also movable by, the supporting member 22, so that the valve member will be freely movable by the auxiliary means hereinafter described.

The upper body member 23 is also of generally rectangular shape in plan view, and extends longitudinally of and is substantially coextensive in length with but is somewhat wider than the lower member 22. The upper member 23 is supported by the member 22 for movement in unison with it and also relative to it, the members being pivotally connected together so that member 23 is fulcrumed on member 22 by means of a pivot pin or rod 33. At its free end adjacent wall 7, the member 22 has a pair of spaced, upstanding ears or bearing members 34 having alined apertures to receive the ends of pin 33. The overlying end of member 23 adjacent wall 7 has a horizontally extended portion 35 positioned between the bearing members 34. The portion 35 has at its mid-point an edge recess 35ᵃ which intersects a bearing bore or aperture 36 extending horizontally through portion 35 and receiving the pin 33. Anchored to the rod 33 in recess 35ᵃ is one end of a helical coil spring 37 having its other end secured to an adjustment member 38 that is adjustably supported by the cover member 2, as by screw threaded engagement in and through a top wall cover member aperture 38ᵃ. This spring 37 is preferably of sufficient elasticity or flexibility that its change in overall length between a position as in Fig. 1 when valve member 16 is closed and a position when liquid is not acting to buoy up member 22 is accompanied by relatively slight change of its resilient force. However, the extent of elongation of spring 37 by weight of members 22, 23 when the members are not buoyed up by liquid, i. e., are supported in air or gas, can determine the downmost position of the members and therefore the maximum or full open position of the valve member 16. The spring 37 serves to balance some part of the weight of the members 22, 23 when the valve is closed, and therefore as liquid enters chamber 10 and rises about members 22, 23 the downward force exerted by the members on or by gravity against the spring will decrease, resulting upon predetermined immersion of the members in upward movement in unison of the members. The extent of decrease in the contractile force exerted by spring 37 as the members 22, 23 move upward under the buoyant force of the liquid with increasing liquid level will determine at seating of the valve member, the extent of immersion of members 22, 23 requisite to seating of the valve member and therefore the maximum desired level of liquid in chamber 10. The adjustment screw 38 is operable to regulate the force applied by the spring in opposition to gravity pull on the members when the valve member is seated in normal operation and therefore determines in conjunction with the spring characteristics, the height of the normal or constant liquid level, designated by the line L—L.

The upper weight member 23 is a solid member but is hollow insofar as there is a downward facing cavity therein being a downward facing, elongated recess 40 in the underside of and opening through one end of the member 23. The recess 40 is defined by a top wall 41, spaced and thick side walls 42 of substantially rectangular cross-section, and an end wall 43 from which portion 35 projects. The upper member 23 normally rests on the lower member 22 at its end opposite pivot rod 33, as shown in Fig. 1, and preferably has a downwardly directed, conical bearing toe or lug 44 adjacent the free end of each side wall 42, which lugs engage the upper surface of the lower member 22 at laterally spaced points beyond or on the opposite side of shaft 25 from the valve member 16. The side walls 42 are of reduced horizontal cross-section, as at 45, adjacent lugs 44 so that the portion of member 23 which is of reduced width can pass between the bracket arms 26.

Carried by the member 23 within recess 40, so that it is between the lower and upper members 22, 23, there is an auxiliary valve actuating means, preferably a toggle mechanism that may comprise in general two substantially horizontal, movable arms or levers 46 and 47 and a helical coil spring 48. The levers 46, 47 may be formed of sheet metal, if desired, and are preferably arranged in end to end relation with each other and extend longitudinally of the elongated recess 40. The outer end of the lever 46 is preferably bifurcated providing a pair of spaced, substantially parallel, extended portions or arms 49, the terminal ends of which may have knife edges for seating or engaging in horizontal, alined and spaced V-grooves or sockets 50 provided in the inner face of end wall 43 adjacent its bottom and below the fulcrum pin 33. The inner or adjacently positioned abutting ends of the levers 46, 47 are also bifurcated or have end slots so that each lever has spaced, substantially parallel arm portions, designated 51 and 50ᵃ respectively. Rigidly secured to the ends of and forming extensions of the arm portions 51 are abutment members 52 that may be provided with horizontal V-grooves or sockets 53 to receive the ends of the lever arm portions 50ᵃ which terminate in groove-engaging knife edges, as shown. Each of the abutment members 52 has on its underside a thrust or abutment member 54 in the form of a downward extending conical button or toe for seating engagement on the top face of member 22, the members 54 serving to elevate the end of lever 46 to permit free turning of lever 47. The lever 47 extends outwardly beyond the valve member 16 and between the reduced cross-section portions 45, and terminates in a tubular return-bent portion 54ᵃ which receives a crossbar or rod 55. In the side wall portions 45 there are oppositely positioned, horizontal guideways 56 which slidably receive the projecting end portions of rod 55. The guideways 56 are preferably end slots or apertures which extend longitudinally of the member 23, opening toward the wall 6. The lever 47 is provided with an aperture 57 through which the valve stem 29 extends, and which is of sufficient size to permit free movement of the lever. The levers 46, 47 are arranged with their abutting ends disposed below the spring 48 and a line joining their outer ends, and at an obtuse angle to each other slightly less than 180°. One end of the spring 48 is attached to the lever 47 and anchored in a lever hole 57ᵃ at a point inward of and adjacent valve stem aperture 57, the other spring end extending through a vertical slot 57ᵇ in end wall 43 and being secured to an adjustment member 58 carried by wall 43. The member 58 is preferably a screw which is vertically adjustable in the end wall 43 in a threaded aperture which opens into slot 57ᵇ, the screw having a circumferential groove to receive the looped end of spring 48. The spring 48 acts at an acute angle on the lever 47 so that an upward component of force of the spring tends to pivot the lever and the member 23 in a clockwise direction, facing Fig. 1. Vertical adjustment of screw 58 changes the angle at which spring 48 acts upon the lever 47 and thereby determines the extent of rise of liquid level on or about member 23, or the increase of liquid level above line L—L which will actuate the auxiliary means. The valve stem 29 has an abutment member 60 in the form of a cross-pin extending radially beyond the periphery of aperture 30 and spaced above and engageable by the top face of the member 23. One or more apertures 61 are preferably provided through the top wall 41 of the member 23 to vent to atmosphere any air and other gases which might pocket in the recess 40 and also serve to overcome vacuum drag by admitting air to recess 40 upon upward movement of member 23.

Any suitable means such as a manually operable plunger 62 may be provided for resetting the auxiliary actuating mechanism. The plunger 62 may be carried by and project through the cover 2 and be located so as to engage the upper surface of the member 23 adjacent the free end thereof. A helical coil spring 63 surrounds the plunger 62 and is held under compression between the external plunger head 63a and the cover 2, to yieldably hold the plunger 62 in its "up" or inactive position and out of opposing relation to member 23 upon movement thereof.

The outlet 12 from chamber 10 is controlled by a manually adjustable, longitudinally reciprocal metering valve having a stem 65 which at its lower end is reciprocally fitted in a valve port through an outlet boss 66, and has a conical cutoff or closure portion 67 and a slotted metering portion 68. The valve is urged toward closed position by a helical compression spring 69 which acts against a collar or flange 70 on the valve stem 65. The upper end of stem 65 projects through the cover 2 and has a hand grip head 72 which is rotatably supported in an external cylindrical projection 73 on the cover 2. The stem 65 passes through a vertical side clearance aperture or recess 74 in the rear side wall 42, and an alined aperture or recess 74a in the rear edge of the member 22 so that the outlet 12 is beneath the mechanism 20 while permitting free, unobstructed pivotal movement of the members 22 and 23. The valve is preferably provided with venting means comprising a longitudinal axial passageway 75 opening at its lower end through the bottom end of the valve stem 65, and at its upper end opening into chamber 10, as at 75a, above the liquid level.

The operation of my control device as applied for example to the feed of an oil burner is as follows: The inlet 11 is connected by suitable piping to a source of liquid fuel such as a supply tank and the outlet 12 is connected by suitable piping to the burner. The adjustment screw 38 is raised or lowered to regulate the oil level to be maintained in the chamber 10 and therefore in the fire-pot of the burner, the showing in Fig. 1 illustrating a normal liquid level at the line L—L such that the valve head 17 is seated to stop further admission of liquid fuel from the inlet to the chamber 10. The extent of increase of liquid level above the line L—L which will render the safety valve-closing means active is determined by the upward component of force of spring 48 which component is determined by the adjustment screw 58, the lowering of the screw and its attached spring end serving to increase the predetermined increase of liquid level above line L—L which will cause operation of the safety or auxiliary means. When the normal liquid level and the safety level have been determined as above, then opening of the metering valve by hand grip member 72 will permit flow of fuel through outlet 12 to the burner. This flow from chamber 10 will decrease the liquid level therein so that the members 22, 23 will move as a unit in a clockwise direction, facing Fig. 1, and pivot about the supporting shaft 25 with the result that valve member 16 will move downward by force of gravity and the head pressure of the supplied liquid and will open the port 13. With the burner in operation and the flow through outlet 12 constant, the valve member 16 will have a slight throttling movement relative to its seat 15 to maintain the admission of liquid to the chamber 10 substantially equal to the liquid discharging from the outlet 12. The members 22, 23 will move upward and downward in unison and substantially in accordance with the rise and the fall of liquid level in the chamber 10 for although these members are of metal and are therefore of a specific gravity greater than that of the fuel oil, the inherent force of the spring 37 when the valve is substantially seated, more than counterbalances the difference between the downward force due to the mass of members 22, 23 and the buoyant upward force of liquid displaced by members 22, 23.

If during the supply of liquid to inlet 11, the valve head 17 should fail to seat tightly or to prevent further admission of liquid as the level increases above the line L—L and should continue to permit liquid to enter chamber 10, then when the liquid level in chamber 10 rises say to the line L'—L', the safety mechanism will function as follows: The increased displacement of liquid by member 23 due to the liquid rise from line L—L to line L'—L' will exert a sufficient upward of buoyant force on member 23 to exceed slightly or overbalance the differential between the weight or gravitational force of member 23 tending to hold it down or turn it counterclockwise about shaft 33 and the force of the upward component of spring 48 acting on lever 47 and tending to lift or turn the member 23 clockwise about the shaft 33. As soon as this differential of forces and the friction of the parts is overcome, the spring 48 will lift the lever 47 on its fulcrum, turning it clockwise about the end of lever 46, thereby increasing the angle between the lever 47 and the line of the spring 48 which, although the inherent force of spring 48 decreases, will increase the upward component of force of spring 48 on lever 47. Lever 47 can move upward only as it moves the member 23 upward by reason of engagement of the ends of bar 55 with the downward facing surface of slot 56, rod 55 moving inward toward valve member 16 as member 23 moves upward. Due to the increase of the spring angle as above noted, the upward movement of member 23 will be accelerated for each increment of its movement. The member 23 will therefore strike the valve cross member 60 with a sharp hammer blow and move the valve member 16 upward to its seat 15 and with sufficient force so that any foreign matter which might be obstructing valve movement will be crushed or cut. The apertures 30 and 61 in addition to venting air or gases from recess 40 also permit entrance of air or gases to the recess 40 on upward movement of member 23 so that there will be no vacuum created which would tend to prevent a substantially snap action by the member 23 in its valve closing movement. The upward movement of member 23 causes a decrease in the liquid level toward and substantially to line L—L in chamber 10 so that increase in burner flame height by reason of level increase to line L'—L' will be counteracted upon operation of the safety mechanism.

When the auxiliary member 23 has been pivoted upwardly to close the valve, the liquid in reservoir 10 will continue to flow therefrom through outlet 12 and when the burner is no longer supplied with fuel or the decreasing flame indicates that the supply is becoming exhausted, then the safety mechanism can be reset by pushing downward on plunger 62 which will on downward movement engage the free end of member 23 and move it downward to the position shown in Fig. 1 in which the upward component of force of spring 48 is insufficient of itself and without the buoyant force of the increased liquid level to move member 22 upward again. Upon release of plunger 62 the spring 63 will return it to its inactive position as shown.

It is to be noted that all of the operating mechanism within the chamber 10 including the plunger 62, the normal and auxiliary means for inlet valve member 16 and the metering valve is carried by the cover member 2 and is removable therewith from the casing as a unit. All of the mechanism is therefore readily removable for inspection and examination of the cooperative engagement and interaction of the parts and for replacement of any parts should this be necessary.

What I claim and desire to secure by Letters Patent of the United States is:

1. In a control device for controlling a controlled means, a movable control means, supporting means, a pair of actuating members carried by said supporting means, each of said members being directly actuated by the controlled means, one of said members being mounted on and movable relative to the other of said members, said one member being initially movable relative to said other member by the controlled means, means operable to transmit movement from said other member to said control means, means separate from said operable means and operable independently of said first-named transmitting means to transmit movement from said one member to said control means, and means operable independently of said controlled means to move said one member upon initial movement of said one member relative to said other member so that said one member will act through said second-named transmitting means upon said control means.

2. In a control device, a movable control means, supporting means, a pair of operating members movable in unison and carried by said supporting means, one of said members being mounted on and movable relative to the other of said members, means operable to transmit movement from said other member to said control means, means separate from said operable means and operable to transmit movement from said one member to said control means, means determining the force requisite to movement of said members in unison, and means determining the force requisite to initiate movement of said one member relative to said other member and operable upon such initial movement to move said one member so that said one member will act through said second-named transmitting means upon said control means.

3. In a control device, a movable control means, supporting means, a pair of operating members, means pivotally connecting one of said members on said supporting means, means pivotally supporting the other of said members on said one member, means cooperable with said supporting means and acting on said one member in opposition to force of gravity and determining the force requisite to movement of said members in unison against force of gravity, and means exerting a force tending to move said other member relative to said one member and determining the force requisite to initiate movement of said other member in opposition to force of gravity, and means operable to transmit movement from said members to said control means.

4. In a control device, a movable control means, supporting means, a pair of movable operating members, means pivotally connecting one of said members to said supporting means, means pivotally supporting the other of said operating members on said one member, means operable to transmit movement from said one member to said control means, means operable to transmit movement from said other member to said control means, a lever in operative engagement with said one member, and means carried by said other member and acting through said lever against said one member and exerting a predetermined force less than the force acting to hold said other member against movement relative to said one member so as to determine the force which will initiate movement of said other member relative to said one member.

5. In a control device, a movable control means, supporting means, a pair of movable operating members, means pivotally connecting one of said members to said supporting means, means pivotally supporting the other of said operating members on said one member, means operable to transmit movement from said one member to said control means, means operable to transmit movement from said other member to said control means, a pair of toggle levers in abutting articulated relation and having their free ends acting on said other member and having engagement with said one member intermediate their free ends, and means acting between one of said levers and said other member and exerting a component of its force through said one lever to urge said other member relative to said one member, said last-named means exerting a predetermined force less than the force acting to hold said other member against movement relative to said one member so as to determine the force which will initiate movement of said other member relative to said one member.

6. In a control device, a movable control means, supporting means, a pair of movable operating members, means pivotally connecting one of said members to said supporting means, means pivotally supporting the other of said operating members on said one member, means operable to transmit movement from said one member to said control means, means operable to transmit movement from said other member to said control means, a pair of toggle levers in abutting articulated relation, the free end of one of said levers being fulcrumed on said other member, means operatively connecting the free end of the other of said levers in reciprocal guided relation to said other member, one of said levers having lateral engagement with said one member adjacent the point of articulation, and means acting between the guided one of said levers and said other member and exerting a component of its force through the guided one of said levers to urge said other member relative to said one member, said last-named means exerting a predetermined force less than the force acting to hold said other member against movement relative to said one member so as to determine the force which will initiate movement of said other member relative to said one member.

7. In a liquid level control device, a container having a reservoir for liquid with a port for liquid flow, a valve member controlling said port, a movable supporting member positioned to displace liquid in said reservoir, means operatively connecting said supporting member to said valve member, said supporting member tending by force of liquid displacement to move said valve member and acting upon movement to move said valve member, a member carried by said supporting member and positioned to displace liquid in said reservoir, and means operable upon predetermined liquid displacement by said carried member to urge said valve member relative to said port.

8. In a liquid level control device, a container having a reservoir for liquid with a port for liquid flow, a valve member controlling said port, a movable supporting member positioned to displace liquid in said reservoir, means operatively connecting said supporting member to said valve member, said supporting member tending by force of liquid displacement to move said valve member and acting upon movement to move said valve member, a member carried by said supporting member and operable on movement to urge said valve member relative to said port, said carried member being positioned to displace liquid in said reservoir, and means carried by said carried member and reacting against said supporting member to move said carried member upon predetermined liquid displacement by said carried member.

9. In a liquid level control device, a container having a reservoir for liquid with a port for liquid flow, a valve member controlling said port, supporting means rigid with said container, a supporting member fulcrumed on said means and moved by the change of liquid level in said reservoir, means acting on said supporting member in opposition to force of gravity and determining the buoyant force requisite to lifting of said member, means operatively connecting said supporting member to said valve member so that said valve member will be moved upon movement of said supporting member, a member movable relative to and carried by said supporting member and positioned to displace liquid in said reservoir, and means operable upon predetermined liquid displacement by said carried member to urge said valve member relative to said port.

10. In a liquid level control device, a container having a reservoir for liquid with a port for liquid flow, a valve member controlling said port, a movable supporting member positioned to displace liquid in said reservoir and tending by force of liquid displacement to move said valve member, means operatively connecting said supporting member to said valve member so that said valve member will be moved upon movement of said supporting member, a movable member fulcrumed adjacent one end on and overlying said supporting member and positioned to displace liquid in said reservoir, abutment means on said valve member and engageable by and spaced from said movable member, means having a component of force predetermining the extent of liquid displacement by said movable member which will initiate movement of said movable member, said last-named means being so arranged relative to said movable member that the component increases upon movement of said movable member so that the movable member will upon initial movement have a continued quick movement into engagement with said abutment means thereby to urge said valve member relative to said port.

11. In a liquid level control device, a container having a reservoir for liquid with a discharge passageway, a cover member on said container and having an inlet passageway opening into said reservoir, an operating member fulcrumed within said container and positioned beneath said inlet passageway, a valve member supported on said operating member and controlling said inlet passageway, means supported by said cover member and acting on said operating member in opposition to force of gravity, an operating member extending longitudinally of and fulcrumed on said first-named operating member and movable by the buoyant force of the liquid in said reservoir, abutment means on said valve member spaced from and engageable by said second-named operating member, said second-named operating member having longitudinally spaced abutment portions and having intermediate said portions an open underside portion, a pair of toggle levers positioned in said open portion and having their free ends respectively engaging said abutment portions, one of said levers engaging said first-named operating member so that upon increase of the included angle between said levers said operating members will be separated, and force-exerting means acting between one of said levers and the abutment portion for the other of said levers and tending to decrease said angle and to urge said second-named operating member toward said abutment means so that upon movement of said second-named operating member relative to said first-named operating member by the buoyant force of the liquid in said reservoir said force-exerting means will act to move said second-named operating member into engagement with said abutment means.

12. In a liquid level control device, a container having a reservoir for liquid with a discharge passageway, a cover member on said container and having an inlet passageway opening into said reservoir, an operating member fulcrumed within said container and positioned beneath said inlet passageway, a valve member supported on said operating member and controlling said inlet passageway, a shaft extending transverse to said valve member and supported by said operating member, an operating member extending in overlying longitudinal relation to said first-named operating member and pivotally supported by said shaft, said second-named operating member being positioned to displace liquid in said reservoir and being movable by the force of liquid displacement, a helical coil spring acting on said first-named operating member in opposition to force of gravity and anchored at one end to said cover member and at its other end to said shaft, abutment means on said valve member spaced from and engageable by said second-named operating member, said second-named operating member having a longitudinally extending downward open recess in its underside, the side walls of said recess adjacent one end thereof having oppositely positioned longitudinal guideways, a cross member having its end portions positioned and guided for movement in said guideways and longitudinally of said second-named operating member, a lever having one end secured to said cross member and having its other end portion bearing downward against said first-named operating member, a second lever pivotally engaging said first-named lever at one end and at its other end being pivotally supported by the end wall of said recess opposite said one recess end, and a tension spring anchored at one end to said end wall and at its other end to said first-named lever so as to urge said second-named operating member upward away from said first-named operating member 13. In a constant liquid level controlling device, a member having an inlet port for the liquid, a movable valve member cooperable with and controlling flow through said port, means having a plurality of positions and operable to transmit movement to said valve member, and a body member movably responsive to changes of liquid level and acting through said transmitting means upon changes of liquid level to move said valve member and to position said valve member to maintain a constant level, said valve member having an abutment, said body member directly engaging said abutment to close said valve member upon increase of liquid level above said constant level.

14. In a liquid level responsive device, a supporting means, an operated member carried by said means, a movable liquid level responsive member cooperable with and for actuating said operated member and having a fulcrum on said means, spring means acting on said movable member, and thrust means operable to transmit a component of force of said spring means to said supporting means, said thrust means having engagement with said movable member and acting to transmit the remaining component of force of said spring means to said movable member so that said fulcrum is free of the binding force of the remaining component.

15. In a control device, a movable control means, supporting means, a pair of operating members movable in unison and carried by said supporting means, one of said members being mounted on and movable relative to the other of said members, means operable to transmit movement from said other member to said control means, means operable to transmit movement from said one member to said control means, means determining the force requisite to movement of said members in unison, and force means determining the force requisite to initiate movement of said one member relative to said other member, said one member upon movement acting to move said control means, said force means having a component of force operable to increase in magnitude upon initial relative movement of said members to thereby insure positive movement of said control means.

16. In a control device, a movable control means, supporting means, a pair of operating members movable in unison and carried by said supporting means, one of said members being mounted on and movable relative to the other of said members, means operable to transmit movement from said other member to said control means, means operable to transmit movement from said one member to said control means, means determining the force requisite to movement of said members in unison, force means determining the force requisite to initiate movement of said one member relative to said other member, said one member upon movement acting to move said control means, said force means having a component of force operable to increase in magnitude upon initial relative movement of said members to thereby insure positive movement of said control means, and means for adjusting said force means.

17. In a liquid level control device, a container having a reservoir for liquid with a port for liquid flow, a valve member controlling said port, a movable supporting member positioned to displace liquid in said reservoir, means operatively connecting said supporting member to said valve member, said supporting member tending by force of liquid displacement to move said valve member and acting upon movement to move said valve member, a float member having a specific gravity greater than the liquid and carried by said supporting member and positioned to displace liquid in said reservoir, and means operable upon predetermined liquid displacement by said float member to urge said valve member relative to said port.

18. In a liquid level control device, a container having a reservoir for liquid with a port for liquid flow, a valve member controlling said port, a movable supporting member positioned to displace liquid in said reservoir, means operatively connecting said supporting member to said valve member, said supporting member tending by force of liquid displacement to move said valve member and acting upon movement to move said valve member, a member carried by said supporting member and positioned to displace liquid in said reservoir, and means operable upon predetermined liquid displacement by said carried member to urge said valve member relative to said port and acting to quickly move said carried member thereby to quickly lower the liquid level in said reservoir.

19. In a control device, a movable control means, supporting means, a pair of movable operating members, means pivotally connecting one of said members to said supporting means, means pivotally supporting the other of said operating members on said one member, means operable to transmit movement from said members to said control means, a pair of toggle levers in abutting articulated relation and having their free ends acting on said other member and having engagement with said one member intermediate their free ends, and means acting between one of said levers and said other member and exerting a component of its force through said one lever to urge said other member relative to said one member, said last-named means exerting a predetermind force less than the force acting to hold said other member against movement relative to said one member so as to determine the force which will initiate movement of said other member relative to said one member.

20. In a control device, a movable control means, supporting means, a pair of movable operating members, means pivotally connecting one of said members to said supporting means, means pivotally supporting the other of said operating members on said one member, means operable to transmit movement from said members to said control means, a pair of toggle levers in abutting articulated relation and having their free ends acting on said other member and having engagement with said one member intermediate their free ends, and means acting between one of said levers and said other member and exerting a component of its force through said one lever to urge said other member relative to said one member, said last-named means exerting a predetermined force less than the force acting to hold said other member against movement relative to said one member so as to determine the force which will initiate movement of said other member relative to said one member, said last-named means component exerting an increasing force upon initiation of movement of said other member relative to said one member so that upon initial movement a positive movement is insured.

21. In a device for controlling the flow of liquid, a member having an inlet port for liquid, a movable valve member cooperable with and controlling flow through said port, an actuator operable to move said valve member, a body member movably responsive to changes of liquid level and cooperable with and acting through said actuator upon normal changes of liquid level to move said valve member, force exerting means tending to move said body member in one direction relative to said actuator, said body member upon abnormal changes of liquid level being moved by said force exerting means in said one direction and being cooperable with and acting to move said valve member out of engagement with said actuator regardless of the action of said actuator.

22. In a constant liquid level maintaining device, a reservoir for liquid, the liquid within said reservoir normally being maintained at a substantially constant level, safety means including a member responsive to liquid level and having a specific gravity in excess of the liquid and being operable to stop further admission of liquid to said reservoir upon a predetermined abnormal increase of liquid level above the constant level, a supporting member for said means, and means acting against said supporting member and tending to compensate for the excess in specific gravity of said responsive member, said last-named means acting upon operation of said responsive member to quickly move said responsive member and thereby quickly lower the liquid level in said reservoir.

PHILIP S. RUSSEL.